J. H. DALLMEYER.
LENS FOR PHOTOGRAPHIC PURPOSES.
No. 61,812. Patented Feb. 5, 1867.
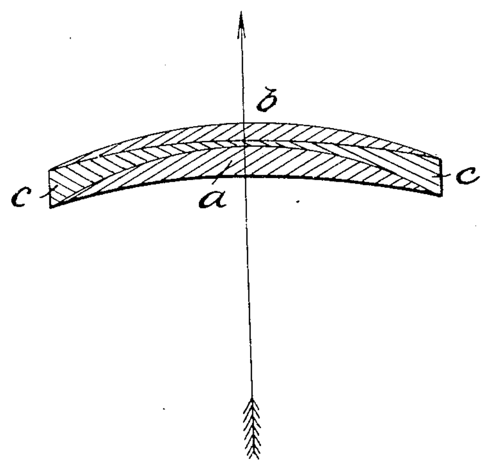
Witnesses:
D. P. Hale Jr
F. Curtis
Inventor
J.H. Dallmeyer
by his attorney.
R. H. Eddy
THE NORRIS PETERS CO., PHOTO-LITHO., WASHINGTON.

United States Patent Office.

JOHN HENRY DALLMEYER, OF LONDON, ENGLAND.

*Letters Patent No.* 61,812, *dated February* 5, 1867.

LENS FOR PHOTOGRAPHIC PURPOSES.

The Schedule referred to in these Letters Patent and making part of the same.

TO ALL TO WHOM IT MAY CONCERN:

Be it known that I, JOHN HENRY DALLMEYER, of 19 Bloomsbury street, in the county of Middlesex, England, optician, a subject of the Queen of Great Britain, have invented or discovered certain "Improvements in the Construction of Lenses, which improvements are especially applicable to lenses for photographic purposes;" and I, the said JOHN HENRY DALLMEYER, do hereby declare the nature of the said invention, and in what manner the same is to be performed, to be particularly described and ascertained in and by the following statement thereof; that is to say—

This invention has for its object improvements in the construction of lenses, which improvements are especially applicable to lenses for photographic purposes. My improved lens is chiefly intended for landscape photography, and from the nature of its construction embraces a larger angle of view, with more perfect correction of both the spherical chromatic aberrations of the oblique or eccentrical pencils than the forms of lenses hitherto used for that purpose. My improved lens is composed of three lenses, by preference cemented together, two of which are made of crown or plate glass, by preference of two different kinds of crown or plate glass, and between the two is positioned a flint glass lens. Thus both external lenses are made of crown or plate glass, and both external surfaces belong to the crown or plate glass lenses; whereas, in the existing forms of view-lenses referred to, consisting of two lenses only, one of crown and the other of flint, one surface of the crown and one of the flint is necessarily exposed, and this latter surface is liable to be affected by atmospheric influences.

The construction of my improved photographic lens is as follows: I form two lenses of crown plate glass, by preference of two different kinds of crown or plate glass, and divide for a given focal length the focal power between the two lenses, by preference in the ratio of one to three, both acting, therefore, as positive or collecting lenses. The form of the first or anterior crown or plate lens is by preference a concave meniscus. The second or posterior crown or plate lens is also by preference a concave meniscus. The central lens, situated between the two crown or plate glass lenses, is made of flint or glass, and concavo-convex, and of such focal power as when placed between the two crown or plate glass lenses, the adjacent surfaces having the same radii of curvature, and being cemented, produce an acromatic whole, or nearly so. Externally, as a whole, my improved photographic lens resembles the view-lenses at present in use; its position with reference to the diaphragm is also nearly the same. My improved photographic lens may also be advantageously employed either singly or in combination with one or more lenses for other purposes.

And in order that my said invention may be most fully understood and readily carried into effect, I will proceed to describe the drawing hereunto annexed.

*Description of the Drawing.*

The drawing show a vertical section of a lens constructed according to my invention, and suitable for use for photographic purposes. *a* is the anterior and *b* the posterior lens. They are of crown or plate glass, and by preference of different qualities, in order that, as is well understood by opticians, a more perfect chromatic correction may be obtained. I prefer that the relation between the radii of curvature of the concave surface of the lens *a* and of the convex surface of the lens *b* should be as 2 1, or thereabout, and also, as before mentioned, that their focal length should be in the relation of 1 3, or thereabout. *c* is the flint glass lens interposed between the lenses *a* and *b* to form a compound lens, which is achromatic, or nearly so. Its curvatures I prefer to correspond with those of the adjacent faces of the lenses *a* and *b*, so that the three portions of the compound lens may be cemented together to form a solid whole. There are, however, some special cases in which it is desirable not to cement the lens *a* to the other portions of the compound lens, viz, in lenses employed specially for photographing architectural objects, for it will be found that the straightness of the lines will be better maintained if the lens *a* is placed at a distance from the other parts of the compound lens. The distance between the lenses *a* and *c* which corresponds with the best performance in this respect is easily found in each case by experiment, or it may be ascertained by calculation. The diaphragm or stop I usually place at a distance of about one-twelfth of the focal length of the lens in front of the lens *a*. I would remark that it is not at all new to make compound lenses in three parts, with a centre negative lens of flint glass covered on both sides with positive lenses of crown or plate glass. Although such lenses are not usually employed for photographic purposes, they are common in telescopes and microscopes. In such compound lenses, however, the flint glass lens *c* has never been made convex on either face, whereas it is an important feature in my improved compound lens that this lens should be convex on one face. Heretofore, also, in such compound lenses, consisting of three parts, the anterior surface of the anterior lens *a* has never been made concave, whereas it is an important (although not absolutely an indispensable) feature of my improved compound lens that it should be so made.

By my improvements a more perfect correction than heretofore of both the spherical and chromatic aberrations of the oblique or eccentric pencils is obtained, whilst at the same time the flint glass lens is protected from injury by the crown or plate glass lenses on either side of it.

I claim ~~the~~ construction of compound lenses, suitable for photographic use, with a negative lens of flint glass, convex on one face, placed intermediate of crown or plate glass lenses, substantially as described.

Also I claim the construction of compound lenses, suitable for photographic use, with a negative lens of flint glass placed intermediate of two crown or plate glass lenses, when the anterior crown or plate glass lens has its anterior face concave, substantially as described.

J. H. DALLMEYER.

Witnesses:

G. F. WARREN, } *No.* 17 *Gracechurch Street, London, E. C.*
HENRY SOUTER, }